(12) United States Patent
Lyell

(10) Patent No.: US 11,819,814 B1
(45) Date of Patent: Nov. 21, 2023

(54) LOCKING ASSEMBLY FOR A MICRO PUREE MACHINE

(71) Applicant: SharkNinja Operating LLC, Needham, MA (US)

(72) Inventor: Nathan Lyell, Surrey (GB)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 18/089,689

(22) Filed: Dec. 28, 2022

(51) Int. Cl.
*B01F 35/42* (2022.01)
*A47J 43/044* (2006.01)
*B01F 101/06* (2022.01)

(52) U.S. Cl.
CPC .............. *B01F 35/42* (2022.01); *A47J 43/044* (2013.01); *A47J 2043/0449* (2013.01); *B01F 2101/06* (2022.01)

(58) Field of Classification Search
CPC .......................... B01F 35/42; A47J 2043/0449
USPC ......................................................... 366/204
See application file for complete search history.

(56) References Cited

U.S. PATENT DOCUMENTS

| | | | |
|---|---|---|---|
| 2,815,194 A | 12/1957 | Seyfried | |
| 2,829,872 A * | 4/1958 | MacDougall | A47J 43/044 74/25 |
| 4,705,055 A | 11/1987 | Rohm et al. | |
| 5,803,377 A | 9/1998 | Farrell | |
| 7,028,607 B2 | 4/2006 | Zweben | |
| 9,968,222 B2 | 5/2018 | Audette | |
| 10,786,119 B2 | 9/2020 | Cheung et al. | |
| 10,794,624 B2 | 10/2020 | Rupp | |
| 10,801,769 B2 | 10/2020 | Rupp | |
| 10,995,976 B2 | 5/2021 | Rupp | |
| 11,002,473 B2 | 5/2021 | Rupp | |
| 11,083,320 B2 | 8/2021 | Zhao et al. | |
| 11,154,163 B1 | 10/2021 | He et al. | |

(Continued)

FOREIGN PATENT DOCUMENTS

| | | |
|---|---|---|
| CN | 201345883 | 11/2009 |
| CN | 103168908 | 6/2013 |

(Continued)

OTHER PUBLICATIONS

International Search Report and Written Opinion in Application No. PCT/CN2022/123017 dated Mar. 23, 2023, 12 pages.

(Continued)

*Primary Examiner* — Marc C Howell
(74) *Attorney, Agent, or Firm* — Burns & Levinson, LLP; Joseph M. Maraia; Marlo Schepper Grolnic

(57) ABSTRACT

Micro puree machines have a locking assembly for locking a container to a coupling on the machine, preventing the container from rotating out of the coupling during processing. The locking assembly includes at least one protrusion on the container configured to slidably engage a slot on an interior surface of the coupling when the container is rotated in a clockwise direction. The coupling has a clip that is moveable from a first position, in which the clip prevents rotation of the container in the counterclockwise direction, to a second position, in which the clip allows rotation of the container in the counterclockwise direction. The clip is spring biased toward the second position. Pressing a button on the coupling moves the clip from the first to the second position.

9 Claims, 10 Drawing Sheets

(56) References Cited

U.S. PATENT DOCUMENTS

| | | | |
|---|---|---|---|
| 11,324,358 B1 | 5/2022 | O'Loughlin et al. | |
| 11,583,144 B1 | 2/2023 | Williams et al. | |
| 2003/0066916 A1 | 4/2003 | Pavlovic et al. | |
| 2005/0047272 A1* | 3/2005 | Sands | A47J 43/0716 366/205 |
| 2005/0172826 A1 | 8/2005 | Kim | |
| 2008/0117714 A1 | 5/2008 | Pavlovic et al. | |
| 2012/0027902 A1 | 2/2012 | Audette et al. | |
| 2012/0048977 A1 | 3/2012 | Machovina et al. | |
| 2014/0203127 A1* | 7/2014 | Merl | A47J 43/0711 241/285.2 |
| 2015/0201808 A1 | 7/2015 | Katsuki et al. | |
| 2015/0216360 A1 | 8/2015 | Hosner | |
| 2021/0055027 A1 | 2/2021 | Rupp | |
| 2021/0106508 A1* | 4/2021 | Akridge | B01F 27/91 |
| 2021/0120841 A1 | 4/2021 | Kiser et al. | |
| 2021/0204564 A1 | 7/2021 | Bellomare et al. | |
| 2022/0202247 A1 | 6/2022 | He et al. | |
| 2022/0202248 A1 | 6/2022 | D'Loughlin et al. | |
| 2022/0202249 A1 | 6/2022 | He et al. | |
| 2022/0202254 A1 | 6/2022 | O'Loughlin | |
| 2022/0225831 A1 | 7/2022 | He et al. | |
| 2023/0010316 A1 | 1/2023 | White et al. | |

FOREIGN PATENT DOCUMENTS

| | | |
|---|---|---|
| CN | 103181715 | 7/2013 |
| CN | 203088680 | 7/2013 |
| CN | 203152409 | 8/2013 |
| CN | 203233980 | 10/2013 |
| CN | 110168296 | 8/2019 |
| CN | 210642278 | 6/2020 |
| CN | 112042801 | 12/2020 |
| CN | 112469283 | 3/2021 |
| CN | 112512393 | 3/2021 |
| CN | 105828630 | 5/2021 |
| CN | 216282190 | 4/2022 |
| EP | 0891139 | 5/2002 |
| EP | 1586259 A1 | 10/2005 |
| EP | 1689250 | 8/2006 |
| EP | 2380474 A2 | 10/2011 |
| EP | 3060069 | 8/2016 |
| EP | 3535532 | 9/2019 |
| EP | 3692873 A1 | 8/2020 |
| EP | 3755160 | 12/2020 |
| EP | 3801042 | 4/2021 |
| EP | 3944796 A1 | 2/2022 |
| ES | 1071424 | 2/2010 |
| FR | 2585588 A1 | 2/1987 |
| IT | 202000005641 A1 | 9/2021 |
| JP | H01-11029 | 3/1989 |
| WO | 2005048745 | 6/2005 |
| WO | 2015061364 | 4/2015 |
| WO | 2018085442 | 5/2018 |
| WO | 2019200491 | 10/2019 |
| WO | 2019224859 | 11/2019 |
| WO | 2020227235 A1 | 11/2020 |
| WO | 2021186353 A2 | 9/2021 |
| WO | 2022020653 A1 | 1/2022 |

OTHER PUBLICATIONS

International Search Report and Written Opinion in Application No. PCT/US2022/053650 dated Jul. 3, 2023, 13 pages.

International Search Report and Written Opinion in Application No. PCT/CN2022/123016 dated Mar. 31, 2023, 11 pages.

International Search Report and Written Opinion in Application No. PCT/US2022/054361 dated Aug. 9, 2023, 14 pages.

* cited by examiner

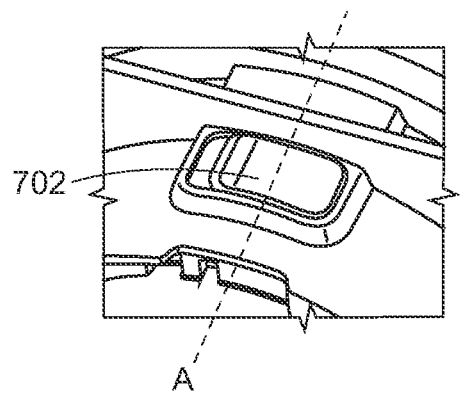
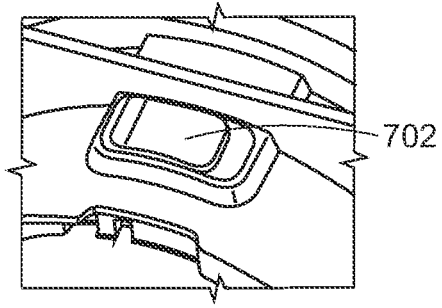
FIG. 6C  FIG. 6D
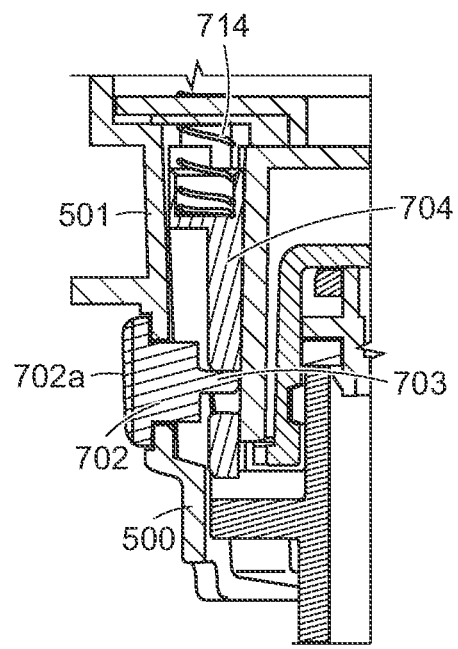
FIG. 6E

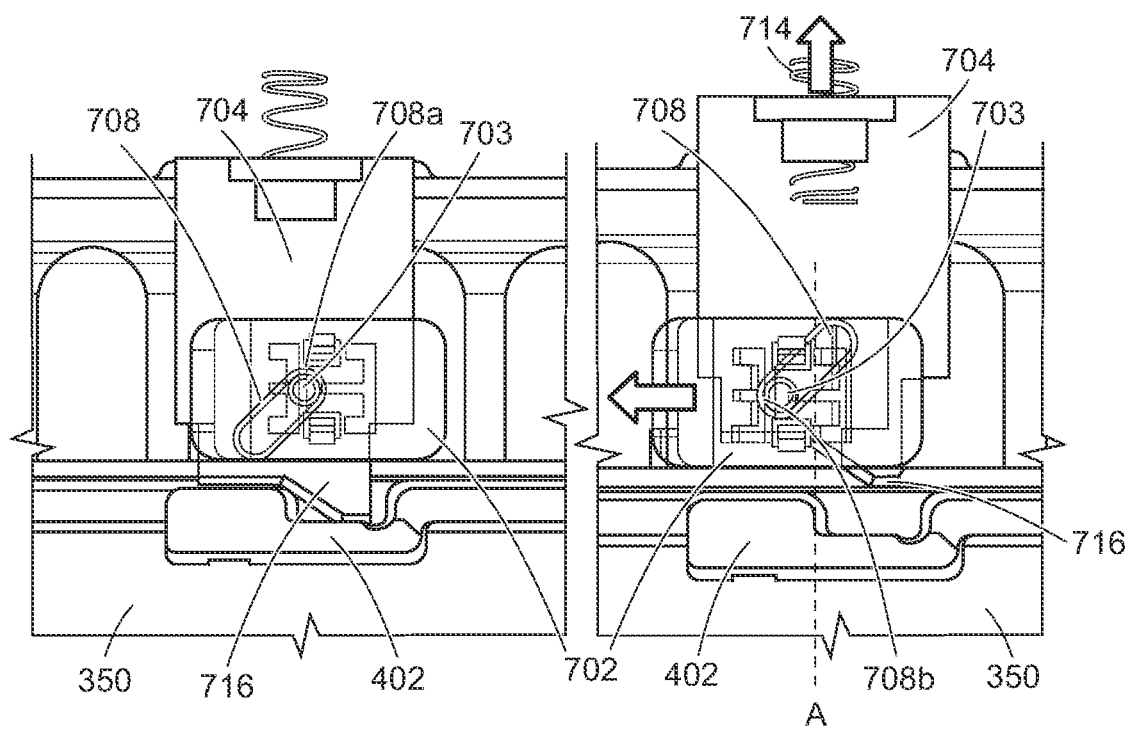

LOCKING ASSEMBLY FOR A MICRO PUREE MACHINE

FIELD OF THE INVENTION

The present disclosure relates to a locking assembly for a food processing device and, more particularly, to a locking assembly for a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a container. The ingredients are then churned by a paddle while a refrigeration mechanism simultaneously freezes the ingredients. These devices have known shortcomings including, but not limited to, the amount of time and effort required by the user to complete the ice cream making process. Machines of this nature are also impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings. However, in some cases, vibration of the machine or other forces during processing may cause the container to become slightly loosened from the coupling of the machine.

SUMMARY

The disclosure describes a micro puree machine with a locking assembly for locking the container to a coupling on the machine, preventing the container from rotating out of the coupling during processing. The locking assembly includes at least one protrusion on the container configured to slidably engage a slot on an interior surface of the coupling when the container is rotated in a clockwise direction. The coupling has a clip that is moveable from a first position, in which the clip prevents rotation of the container in the counterclockwise direction, to a second position, in which the clip allows rotation of the container in the counterclockwise direction. The clip is spring biased toward the second position. Pressing a button on the coupling moves the clip from the first to the second position.

Embodiments of the locking assembly and methods of use of this disclosure may include one or more of the following, in any suitable combination.

Embodiments of a locking assembly for locking a container to a coupling of a micro puree machine of this disclosure include a container having at least one protrusion on an outer surface of the container. The at least one protrusion is configured to slidably engage a slot on an interior surface of the coupling when the at least one protrusion is rotated in a first direction. A clip is positioned within the coupling and moveable from a first position to a second position. The clip is configured to allow rotation of the at least one protrusion into the slot when the clip is in the first position and to prevent rotation of the at least one protrusion out of the slot in a second direction when the clip is in the second position. A button is configured to move the clip from the second position to the first position when the button is actuated toward the clip.

In further embodiments, the container is locked to the coupling when the clip is in the second position. In embodiments, a container axis extending between a top and a bottom of the container is not vertically aligned with a vertical axis of the micro puree machine when the container is locked to the coupling. In embodiments, the container axis forms an angle of between 1 and 180 degrees with respect to the vertical axis of the micro puree machine. In other embodiments, the container axis forms an angle of between 45 and 55 degrees with respect to the vertical axis of the micro puree machine. In embodiments, the clip is configured to move along the container axis between the first position and the second position. In embodiments, the clip is biased toward the second position. In embodiments, the button has a first angled surface configured to engage a second angled surface of the clip to move the clip from the second position to the first position. In embodiments, the clip has a projection configured to engage the at least one protrusion to prevent the at least one protrusion from rotating in the second direction. In embodiments, the button is assembled to the clip by means of a plurality of flexures on the button configured to engage a plurality of slots in the clip.

Embodiments of a method of locking a container to a coupling of a micro puree machine of this disclosure include inserting the container into the coupling. The container has at least one protrusion on an outer surface of the container. The method also includes rotating the container in a first direction relative to the coupling such that the at least one protrusion slidably engages a slot on an interior surface of the coupling. The rotation causes a clip within the coupling to move from a first position to a second position. The method also includes moving the clip from the second position to the first position after the at least one protrusion is fully rotated into the slot. The clip is configured to prevent rotation of the at least one protrusion out of the slot in a second direction when the clip is in the first position.

In further embodiments, a container axis extending between a top and a bottom of the container is not vertically aligned with a vertical axis of the micro puree machine when the container is locked to the coupling. In embodiments, moving the clip from the second position to the first position comprises moving the clip along the container axis. In embodiments, the clip is biased toward the second position. In embodiments, the clip has a projection configured to engage the at least one protrusion to prevent the at least one protrusion from rotating in the second direction.

Embodiments of a method of removing a container from a coupling of a micro puree machine of this disclosure include actuating a button toward a clip within the coupling. The actuation causes the clip to move from a first position to a second position. The method also includes rotating the container relative to the coupling such that at least one protrusion on an outer surface the container slidably disengages from a slot on an interior surface of the coupling. The method also includes removing the container from the coupling. The clip is configured to move from the second position to the first position after the at least one protrusion is fully rotated out of the slot.

In further embodiments, the clip is configured to move along a container axis extending between a top and a bottom of the container when the clip moves from the first position to the second position. In embodiments, the clip is biased toward the first position. In embodiments, the button has a first angled surface configured to engage a second angled surface of the clip to move the clip from the first position to the second position. In embodiments, the button is assembled to the clip by means of a plurality of flexures on the button configured to engage a plurality of slots in the clip.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIGS. 6A-E illustrate components of an alternate bowl lock assembly of this disclosure according to some embodiments; and FIGS. 6F and 6G illustrate a method of using the bowl lock assembly of FIGS. 6A-E to lock and unlock the container from the micro puree machine, according to some embodiments.

DETAILED DESCRIPTION

Figure 1:
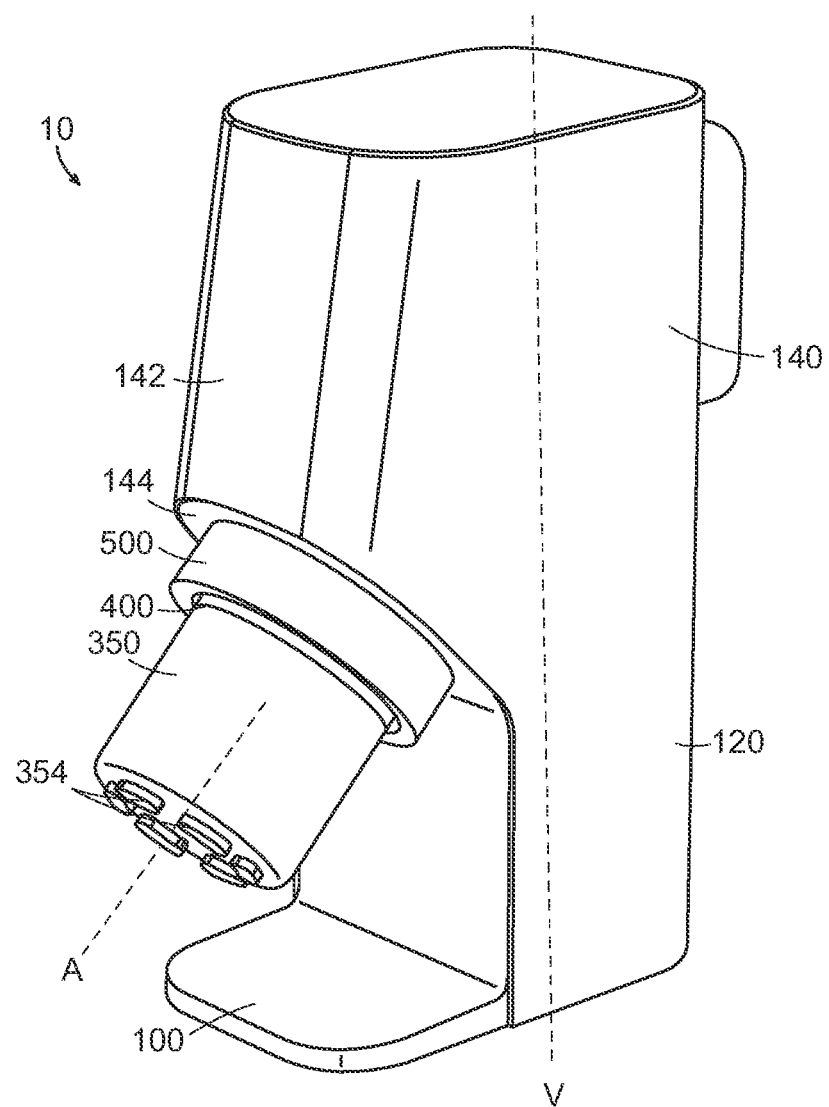
FIG. 1 shows a micro puree machine according to some embodiments of this disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above." "below" and the like helps only in the clear description of the disclosure and does not limit the structure, positioning and/or operation of the locking assembly in any manner.

FIG. 1 shows an isometric view of a micro puree machine 10 according to an illustrative embodiment of the present disclosure. The micro puree machine 10 may include a base 100 and an upper housing 140. A middle housing 120 may extend between the base 100 and the upper housing 140. The upper housing 140 may include an interface 142 for receiving user inputs to control the micro puree machine 10 and/or display information. The micro puree machine 10 may also include a removable container 350 and a lid 400. The container 350 may contain one or more pre-frozen ingredients for processing. A user may couple the container 350 to a coupling 500 on an angled surface 144 of the upper housing 140 by rotating the container 350 relative to the coupling 500, as further described below. When engaged with the coupling 500, the container 350 may not be aligned with a vertical axis V of the micro puree machine 10. Instead, a container axis A extending between a top and bottom of the container 350 may form an angle of between 1 degree and 180 degrees with respect to the vertical axis V. Preferably, the container axis A forms an angle of about 45 degrees to about 55 degrees relative to the vertical axis V. In embodiments, the container 350 may include features 354 on the bottom surface of the container 350 to aid in the fixing of frozen ingredients within the container 350. The features 354 may prevent such frozen ingredients from rotational movement within the container 350 during use. In embodiments, the container 350 can be manufactured from a disposable material to enhance the convenience of using the micro puree machine 10. Further, the container 350 can be sold as a stand-alone item and can also be prefilled with ingredients to be processed during use of the micro puree machine 10.

Figure 2:
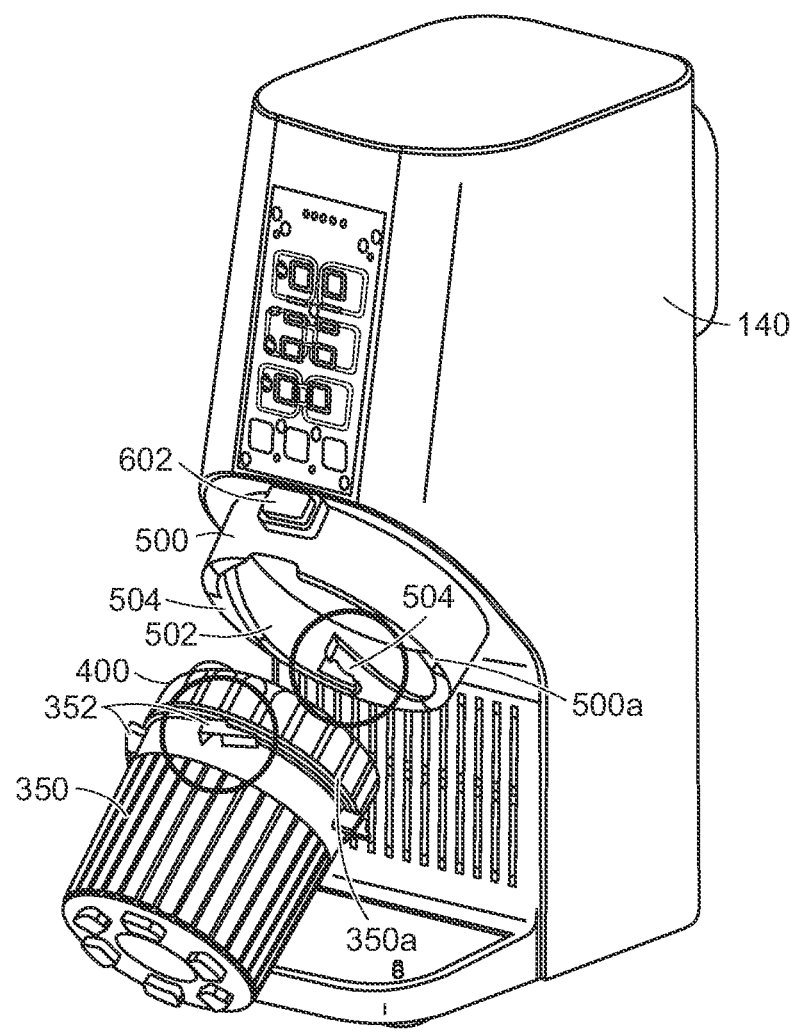
FIG. 2 shows the micro puree machine of FIG. 1 with the container disengaged from the machine according to some embodiments.

FIG. 2 shows the micro puree machine 10 of FIG. 1 with the container 350 and the lid 400 disassembled from the coupling 500 according to some embodiments. As shown in FIG. 2, the coupling 500 may comprise a button 602 for unlocking the container 350 from the coupling 500 as further described below. In embodiments, an inner surface 502 of the coupling 500 may also comprise locating and locking elements for positioning and connecting the container 350 to the coupling 500. For example, the inner surface 502 of the coupling 500 may comprise one or more slots 504 sized to receive at least one corresponding protrusion 352 on an outer surface of the container 350. In some embodiments, the at least one protrusion 352 may be two protrusions 352 spaced on opposing sides of an outer surface of the container 350 and configured to engage two corresponding slots 504 on the coupling 500. In other embodiments, the at least one protrusion 352 may be four protrusions 352 spaced equally apart about an outer surface of the lid 400 and configured to engage four corresponding slots 504 on the coupling 500. However, the disclosure contemplates more or fewer than two or four protrusions 352 and slots 504. The disclosure also contemplates that the protrusions may be positioned on the lid 400, rather than the container 350. In embodiments, the slots 504 may be angled and extend in a helical manner relative to an annular lower surface 500a of the coupling 500. Similarly, the protrusions 352 may be correspondingly angled relative to an upper annular surface 350a of the container 350. In embodiments, insertion of the protrusions 352 into the slots 504 may form a bayonet-type mount.

Figure 3A:
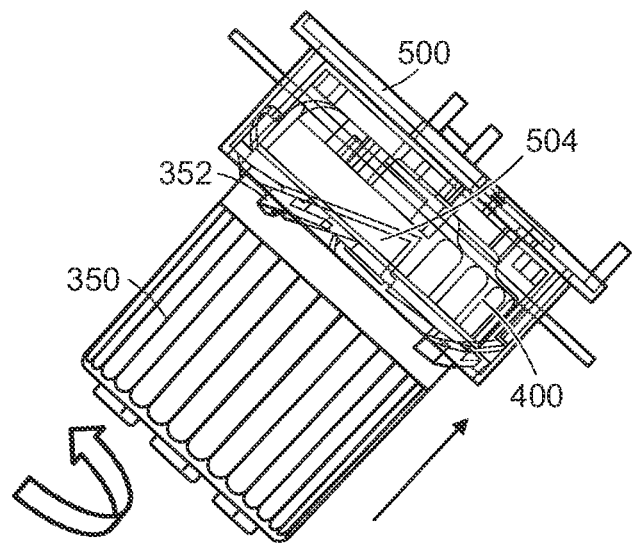
FIGS. 3A and 3B illustrate rotation of the container into the coupling of the micro puree machine, according to some embodiments.
Figure 3B:
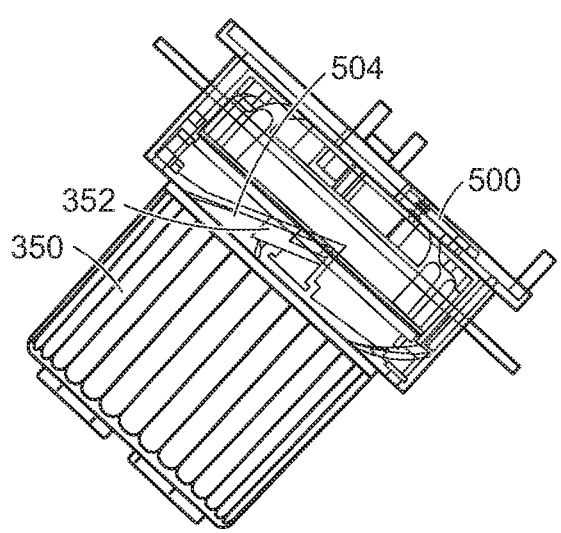

FIG. 3A shows the container 350 inserted into the coupling 500 (shown in a transparent view for ease of illustration) but before the container 350 is secured to the coupling 500 according to some embodiments. As shown in FIG. 3A, the user may rotate the container 350 relative to the coupling 500 in a first direction (e.g., clockwise) such that the protrusions 352 rotate into the slots 504, securing the container 350 to the coupling 500 (FIG. 3B). Because of the angle of the slots 504 and the protrusions 352, rotating the container 350 relative to the coupling 500 may cause the container 350 to move both rotationally and axially within the coupling 500.

Figure 3C:
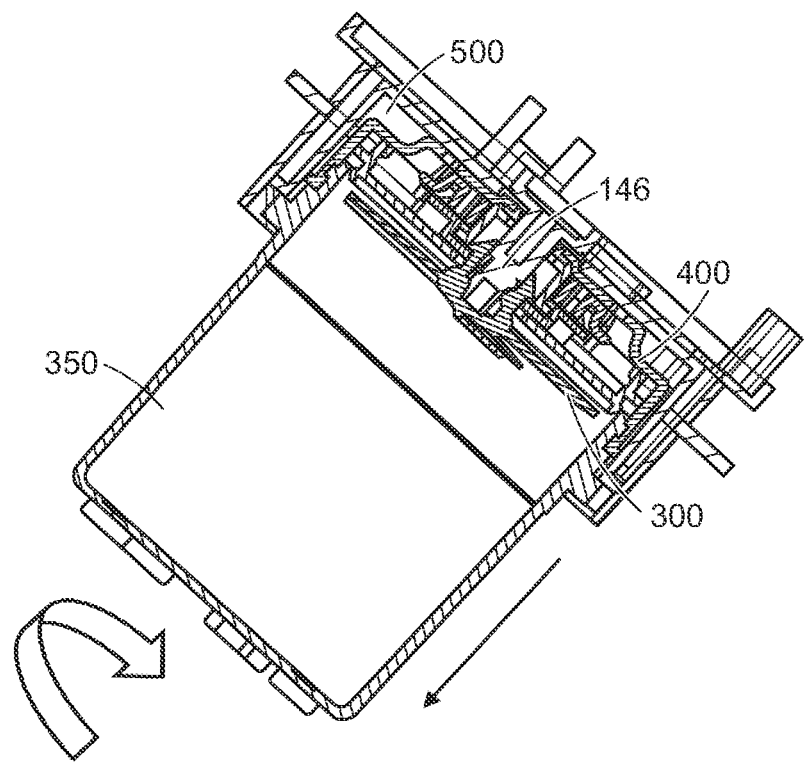
FIGS. 3C and 3D illustration rotation of the container out of the coupling of the micro puree machine, according to some embodiments.
Figure 3D:
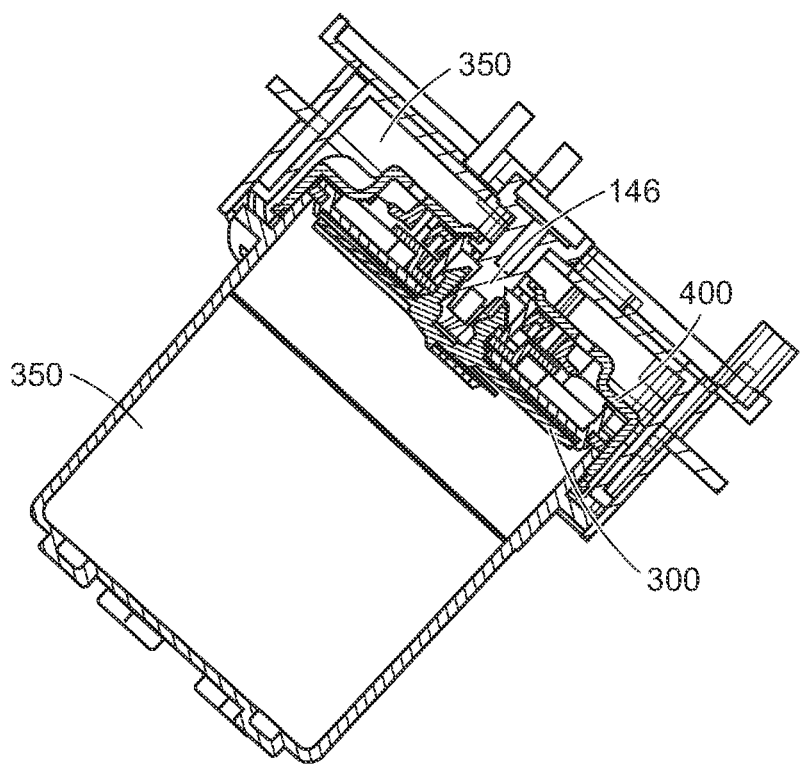

FIG. 3C shows a cross-sectional view of the container 350 secured to the coupling 500 according to some embodiments. As shown in FIG. 3C, the lid 400 may house a blade 300 that engages a power shaft 146 when the container 350 is secured to the coupling 500. When blending frozen ingredients, an ice wall may form between the power shaft 146 and the blade 300, requiring a greater force to disengage the blade 300 from the power shaft 146. However, as shown in FIG. 3D, as the user rotates the container 350 relative to the coupling 500 in a second direction (e.g., counterclockwise) to disengage the container 350 from the coupling 500, the container 350 may move both rotationally and axially away from the coupling 500. This rotational and axial movement may advantageously allow the blade 300 to disengage from power shaft 146 using less force than would be needed if the container 350 could only move rotationally relative to the coupling 500.

Figure 4A:
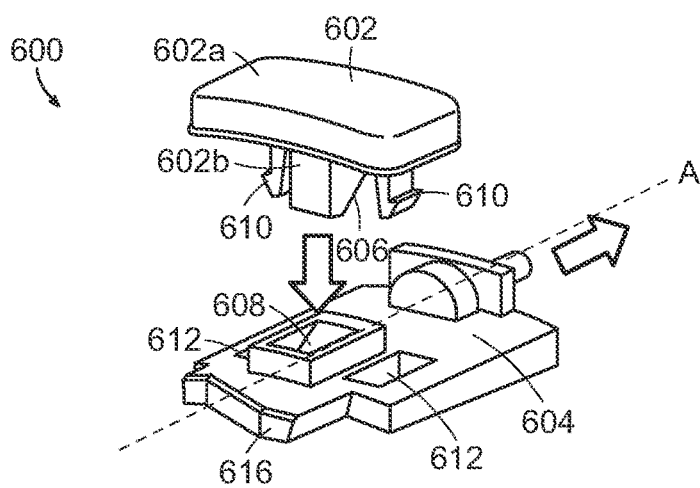
FIGS. 4A-C illustrate components of a bowl lock assembly, according to some embodiments.
Figure 4B:
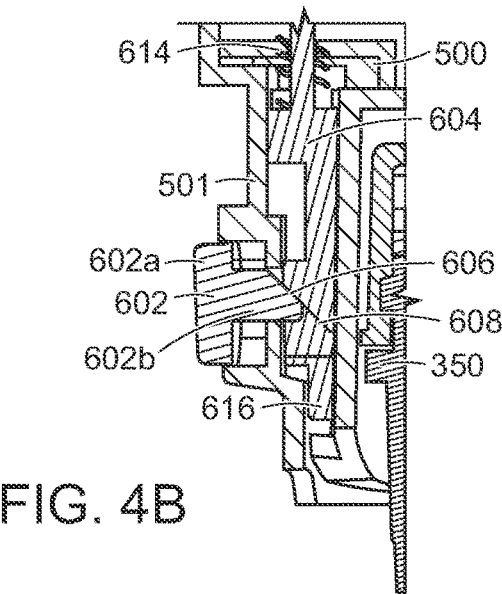
Figure 4C:
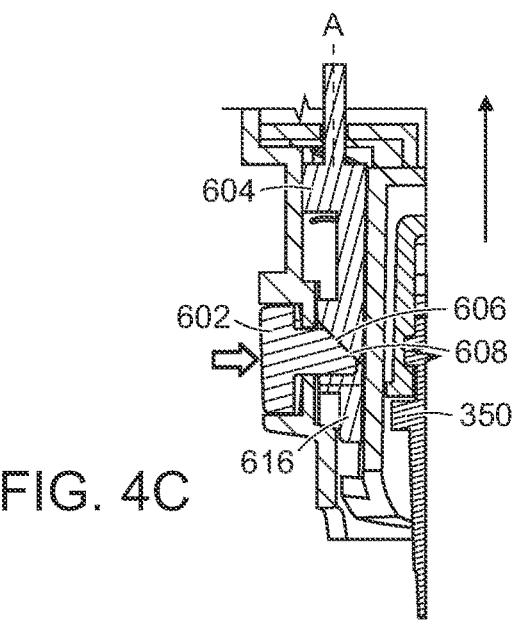

FIGS. 4A-C illustrate components of a bowl lock assembly 600 of this disclosure according to some embodiments. As shown in FIG. 4A, the bowl lock assembly 600 may comprise the button 602 and a moveable clip 604. The button 602 may comprises a first portion 602*a* and a second portion 602*b* having a first angled surface 606. The button 602 may be assembleable to the clip 604 through flexures 610 configured to engage corresponding slots 612 on the clip 604. The first angled surface 606 may be configured to engage a second angled surface 608 on the clip 604 such that actuating the first portion 602*a* of the button 602 (such as by pressing) toward the clip 604 causes the clip 604 to move along the container axis A. A projection 616 on the clip 604 may be configured to engage the protrusions 352, as further described below.

As shown in FIG. 4B, the button 602 may extend through an outer wall 501 of the coupling 500 such that the first portion 602*a* is engageable by a user while the second portion 602*b* extends into the interior of the coupling 500. The clip 604 may be positioned within the interior of the coupling 500 and may be biased by a spring 614 or other biasing element toward a locked position, as shown. When the container 350 is in the locked position (that is, when the protrusions 352 have been fully rotated into the slots 504 of the coupling 500), the first angled surface 606 of the button 602 may only partially engage the second angled surface 608 on the clip 604. In this position, the projection 616 on the clip 604 may prevent the protrusions 352 from rotating out of the slots 504. As shown in FIG. 4C, when the user presses the button 602, the first angled surface 606 may fully engage the second angled surface 608 on the clip 604, moving the clip 604 along the container axis A against the force the spring 614. In this position, the projection 616 may no longer prevent the protrusions 352 from rotating out of the slots 504, allowing the user to rotate the container 350 out of the coupling 500.

Figure 5A:
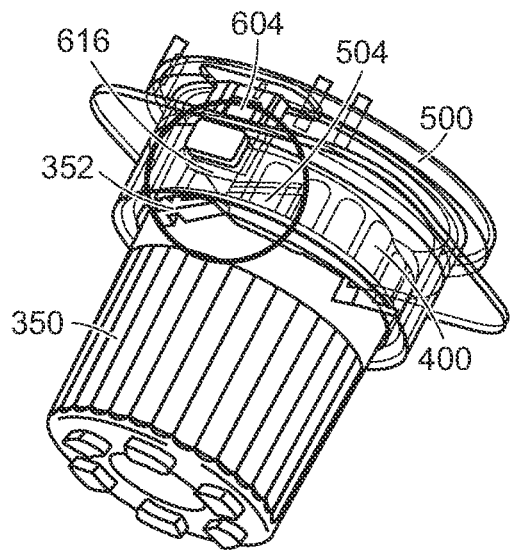
FIGS. 5A-D illustrate a method of using the bowl lock assembly of FIGS. 4A-C to lock and unlock the container from the micro puree machine, according to some embodiments.
Figure 5B:
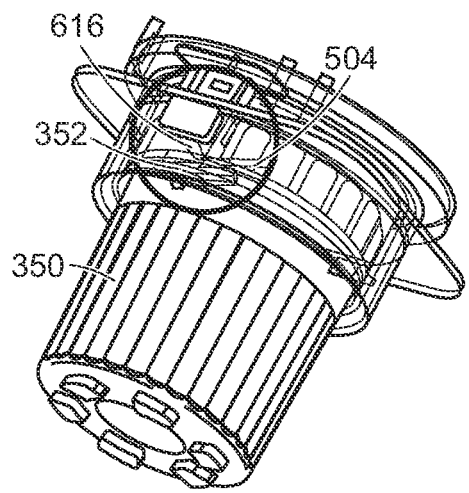
Figure 5C:
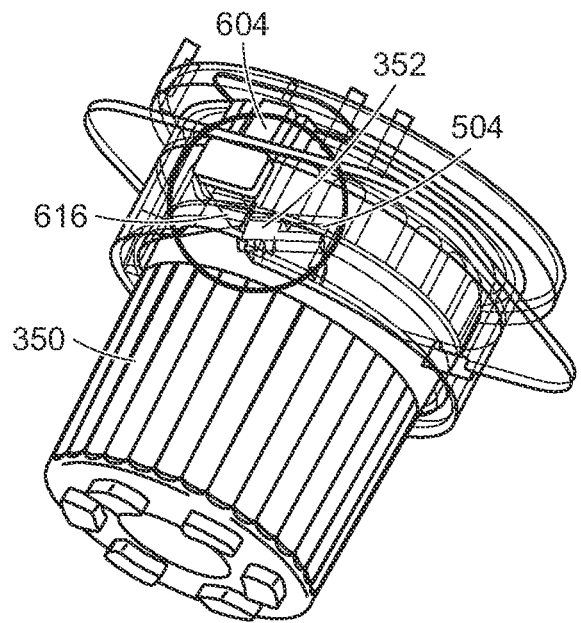
Figure 5D:
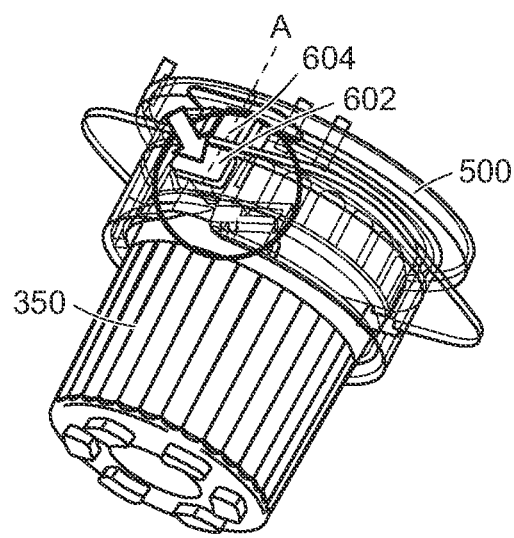

FIGS. 5A-D illustrate a method of locking and unlocking the container 350 from the coupling 500 using the locking assembly 600, according to some embodiments. As shown in FIG. 5A, the user may first insert the container 350 into the coupling 500 such that the protrusions 352 align with the slots 504 on the coupling 500. In this relative position of the container 350 and the coupling 500, the clip 604 may be biased by the spring 614 in the downward position. As shown in FIG. 5B, the user may rotate the container 350 in a first direction (e.g., clockwise) such that the protrusions 352 begin to rotate into the slots 504. As the protrusion 352 rotates past the clip 604, the protrusion 352 pushes the clip 604 upwards against the force of the spring 614. As shown in FIG. 5C, as the user continues to rotate the container 350, the protrusion 352 may rotate passed the projection 616 on the clip 604. Once the protrusion 352 is clockwise of the projection 616, the spring 614 may cause the projection 616 to move downward, preventing the protrusion 352 from being rotated counterclockwise out of the slot 504. As shown in FIG. 5D, when the user wishes to remove the container 350 from the coupling 500, the user may actuate the button 602 to move the clip 604 upwards along the container axis A such that it no longer blocks the protrusion 352 from rotating counterclockwise. This allows the user to rotate the container 350 counterclockwise out of the coupling 500.

Figure 6A:
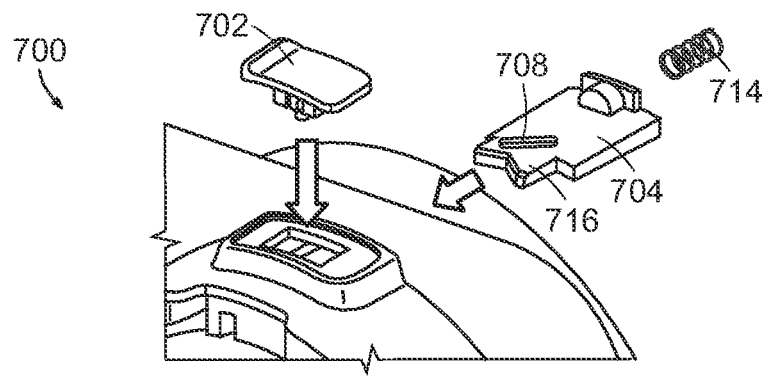
Figure 6B:
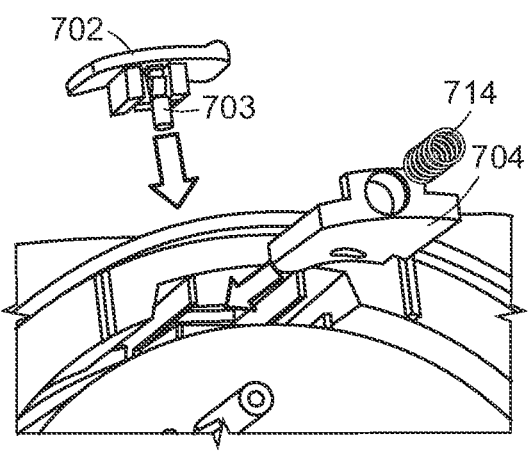

FIGS. 6A-G illustrate an alternate bowl lock assembly 700 of this disclosure according to some embodiments. As shown in FIG. 6A, the bowl lock assembly 700 may comprise a button 702 and a moveable clip 704. The button 702 may comprises a pin 703 (FIG. 6B) configured to engage an angled slot 708 on the clip 704. A projection 716 on the clip 704 may be configured to engage the protrusions 702 on the lid 400. In embodiments, sliding the button 702 along an axis perpendicular to the container axis A from a locked position (FIG. 6C) to an unlocked position (FIG. 6D) may cause the clip 704 to move along the container axis A. As shown in FIG. 6E, the button 702 may extend through an outer wall 501 of the coupling 500 such that a first portion 702*a* is slidable by a user while the pin 703 extends into the interior of the coupling 500. The clip 704 may be positioned in the interior of the coupling 500 and may be biased by a spring 714 or other biasing element toward a locked position.

FIGS. 6F and 6G illustrate a method of locking and unlocking the container 350 from the coupling 500 using the locking assembly 700, according to some embodiments. As shown in FIG. 6F, when the container 350 is in the locked position (that is, when the protrusions 352 have been fully rotated into the slots 504 of the coupling 500), the pin 703 of the button 702 may be positioned in an upper end 708*a* of the angled slot 708. In this position, the projection 716 on the clip 704 may prevent the protrusions 352 from rotating out of the slots 504. As shown in FIG. 6G, when the user slides the button 702 along an axis perpendicular to the container axis A, the pin 703 also moves to the lower end 708*b* of the angled slot 708. This movement of the pin 703 may cause the clip 704 to move along the container axis A against the force the spring 714. In this position of the clip 704, the projection 716 may no longer prevent the protrusions 352 from rotating out of the slots 504, allowing the user to rotate the container 350 out of the coupling 500.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

I claim:

1. A locking assembly for a micro puree machine, the locking assembly comprising:
   a coupling on the micro puree machine, the coupling having an inner surface defining at least one slot;
   a container having at least one protrusion on an outer surface of the container, the at least one protrusion configured to slidably engage the at least one slot on the interior surface of the coupling when the at least one protrusion is rotated in a first direction;
   a clip positioned within the coupling and moveable from a first position to a second position, the clip configured to allow rotation of the at least one protrusion into the at least one slot when the clip is in the first position and to prevent rotation of the at least one protrusion out of the at least one slot in a second direction when the clip is in the second position; and
   a button configured to move the clip from the second position to the first position when the button is actuated toward the clip;
   wherein the clip comprises a projection configured to engage one of the at least one protrusion to prevent the at least one protrusion from rotating in the second direction.

2. The locking assembly of claim 1, wherein the container is locked to the coupling when the clip is in the second position.

3. The locking assembly of claim 2, wherein a container axis extending between a top and a bottom of the container is angled with respect to a vertical axis of the micro puree machine when the container is locked to the coupling.

4. The locking assembly of claim 3, wherein the container axis is angled between 1 and 0 degrees with respect to the vertical axis of the micro puree machine.

5. The locking assembly of claim 3, wherein the container axis is angled between 45 and 55 degrees with respect to the vertical axis of the micro puree machine.

6. The locking assembly of claim 3, wherein the clip is configured to move along the container axis between the first position and the second position.

7. The locking assembly of claim 1, wherein the clip is biased toward the second position.

8. The locking assembly of claim 1, wherein the button comprises a first angled surface configured to engage a second angled surface of the clip to move the clip from the second position to the first position.

9. The locking assembly of claim 1, wherein the button is assembled to the clip by means of a plurality of flexures on the button configured to engage a plurality of slots in the clip.

* * * * *

UNITED STATES PATENT AND TRADEMARK OFFICE
CERTIFICATE OF CORRECTION

| | |
|---|---|
| PATENT NO. | : 11,819,814 B1 |
| APPLICATION NO. | : 18/089689 |
| DATED | : November 21, 2023 |
| INVENTOR(S) | : Nathan Lyell |

It is certified that error appears in the above-identified patent and that said Letters Patent is hereby corrected as shown below:

On the Title Page

Item (56) Please add the following references:

| | | |
|---|---|---|
| 3630493 | 1971-12-28 | Carpigiani |
| 4693611 | 1987-09-15 | Verkler |
| 4828398 | 1989-05-09 | Verkler |
| 5215222 | 1993-06-01 | McGill |
| 5415534 | 1995-05-16 | Bertrand et al. |
| 6250794 | 2001-06-26 | Huang |
| 6824303 | 2004-11-30 | Huang |
| 7264160 | 2007-09-04 | Polarine et al. |
| 7451613 | 2008-11-18 | Barraclough et al. |
| 7993053 | 2011-08-09 | McGill |
| 9351504 | 2016-05-31 | Ricco et al. |
| 9565868 | 2017-02-14 | D'Agostino |
| 9993015 | 2018-06-12 | Geng et al. |
| 10159262 | 2018-12-25 | Dong et al. |
| 10595544 | 2020-03-24 | Beth Halachmi |
| 10660348 | 2020-05-26 | Cheung |
| 11154075 | 2021-10-26 | Ricco et al. |
| 11279609 | 2022-03-22 | Fonte et al. |
| 11337439 | 2022-05-24 | Fonte et al. |
| 11439158 | 2022-09-13 | Farina |
| 11470855 | 2022-10-18 | Fonte et al. |
| 20030000240 | 2003-01-02 | Pahl |
| 20040081733 | 2004-04-29 | Buter et al. |
| 20040161503 | 2004-08-19 | Malone et al. |
| 20050170054 | 2005-08-04 | Czark et al. |
| 20050173462 | 2005-08-11 | Stumler et al. |
| 20060255066 | 2006-11-16 | Kannar et al. |

Signed and Sealed this
Thirtieth Day of January, 2024

*Katherine Kelly Vidal*
Katherine Kelly Vidal
*Director of the United States Patent and Trademark Office*

| | | |
|---|---|---|
| 20070241140 | 2007-10-18 | Cocchi |
| 20120096876 | 2012-04-26 | Ravji et al. |
| 20200260755 | 2020-08-20 | Harrison et al. |
| 20210068419 | 2021-03-11 | Spirk et al. |
| 20210227848 | 2021-07-29 | Yang et al. |
| 20210371265 | 2021-12-02 | Fonte et al. |
| 20220225636 | 2022-07-21 | Minard et al. |
| 0314209 | 1989-05-03 | EPO |
| 0995685 | 2000-04-26 | EPO |
| 1495682 | 2005-01-12 | EPO |
| 3616528 | 2020-03-04 | EPO |
| 102805194 | 2012-02-15 | CN |
| 204362865 | 2015-06-03 | CN |
| 2005070271 | 2005-08-04 | WIPO |
| 2019117804 | 2019-06-20 | WIPO |
| 2019146834 | 2019-08-01 | WIPO |